US006943312B2

(12) United States Patent
Zimmermann

(10) Patent No.: US 6,943,312 B2
(45) Date of Patent: Sep. 13, 2005

(54) METHOD AND DEVICE FOR THE MARKING OF SECTIONS OF A STACK

(75) Inventor: Armin Zimmermann, Constance (DE)

(73) Assignee: Siemens Aktiengesellschaft, München (DE)

(*) Notice: Subject to any disclaimer, the term of this patent is extended or adjusted under 35 U.S.C. 154(b) by 195 days.

(21) Appl. No.: 10/355,035

(22) Filed: Jan. 31, 2003

(65) Prior Publication Data

US 2003/0155703 A1 Aug. 21, 2003

Related U.S. Application Data

(63) Continuation of application No. PCT/DE01/03001, filed on Aug. 13, 2001.

(30) Foreign Application Priority Data

Aug. 11, 2000 (DE) ........................................ 100 39 419

(51) Int. Cl.[7] .............................. B07C 5/01; G06K 9/01

(52) U.S. Cl. ....................... 209/584; 209/900; 700/225; 700/224; 700/223

(58) Field of Search ................................ 209/584, 980, 209/613, 611, 612, 583; 700/219, 221, 223, 224, 225, 226, 227

(56) References Cited

U.S. PATENT DOCUMENTS

| | | | | |
|---|---|---|---|---|
| 4,601,396 A | | 7/1986 | Pavie | |
| 5,096,176 A | | 3/1992 | Golicz et al. | |
| 5,104,681 A | * | 4/1992 | Sansone | 427/8 |
| 5,470,427 A | * | 11/1995 | Mikel et al. | 156/387 |
| 5,924,576 A | * | 7/1999 | Steenge | 209/584 |
| 6,371,521 B1 | * | 4/2002 | Petkovsek | 283/67 |

FOREIGN PATENT DOCUMENTS

| | | | | |
|---|---|---|---|---|
| EP | 095737 A2 | * | 7/1983 | B07C/3/18 |
| EP | 0885828 A2 | | 12/1998 | |
| JP | 2001151404 | | 6/2001 | |

* cited by examiner

*Primary Examiner*—Donald P. Walsh
*Assistant Examiner*—Jonathan R Miller
(74) *Attorney, Agent, or Firm*—Jacob Eisenberg; Siemens AG

(57) ABSTRACT

The invention relates to a system and method for the marking sections of a stack of items, such as mail items, to be sorted in sorting machines according to a distribution order. After reading and allocating a destination address to the stopping points of the distribution order, the last or the first and the last mail item of a section of a stack to be distinguished in a stack is automatically provided with an easily removable sticker, well visible in the stack, by an sticker dispenser, which is placed in the sorting machine after the reading unit for the distribution information and before the distribution unit. The stickers are then removed again during the distribution of the mail items to the receivers of the mail items.

35 Claims, 2 Drawing Sheets

METHOD AND DEVICE FOR THE MARKING OF SECTIONS OF A STACK

CROSS REFERENCE TO RELATED APPLICATIONS

The present application is a continuation of and claims priority to International Application number PCT/DE01/03001, filed Aug. 13, 2001 and further claims priority to German patent application number 10039419.1, filed Aug. 11, 2001, the both of which are herein incorporated by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to a method and apparatus for marking sections of items in a stack, the markings corresponding to item distribution order as may be effected by and appropriate sorting machine or machines. The items may comprise mail or postal items.

For mail item sorting processes, a particular sorting order is followed. Pursuant to this order, stacks of mail items are produced. The sorting is effected by at least one sorting machine in cooperation with manual handling.

The mail item stacks are manually placed in containers in a distribution order. The manual placement is performed by loading personnel. The loading personnel further mark sections of the stacks so as to enable new formations as well as to create a rational and secure sorting process. Accordingly, sections of a stack are marked for the respective letter carrier delivery and/or for different stopping points of the distribution order.

To date, separating cards were used for marking sections of a stack. The cards are generally larger than the average mail item and may include processing information thereon. The cards are then fed into the sorting machine with the mail items to be sorted, which, for example, in a 3-run sequential process, are brought into the distribution order for 4 letter carriers. Herein, sorting is made to the units digit in the first run, to the tens digit in the second run and to the hundreds digit in the third run. At the end of the sorting process, the separating cards stand between the areas of the individual letter carriers as determined according to the sorting plan. The separating cards can be inserted for the marking of mail items for the individual stopping points in the same manner. The following disadvantages occur at usage of the separating cards. The separating cards need to: be placed at disposal, be sorted out from stacks which are not worked on anymore, be organized, and be inserted into the feeder at the beginning or the end of a sorting process. The distribution of the separating cards costs time and thereby reduces the operational throughput. The separating cards wear out and need to be renewed regularly. The separating cards substantially increase the mass to be transferred, which is particularly critical for the marking of the stopping points of the letter carrier. The separating cards need to be carried back to the post office by the letter carrier. Accordingly, a need exists to better mark a stack of items, such as mail pieces, so as to overcome at the least the aforementioned problems.

SUMMARY OF THE INVENTION

The present invention will be discussed with respect to a particular application to mail or postal items. Such is one of many applications as may be envisioned by one skilled in the art. The present invention is directed to marking sections of stacks of mail items which were sorted by a sorting machine according to a distribution order. The marking is effected without the use of separating cards. This is obtained, according to the invention, by the automatic marking of the last and/or the first and the last mail items of a section of a stack. The mail items in the section are to be distinguished by a visible, easily removable sticker, which is applied by an automatic sticker dispenser. The stickers can be applied as soon as the receiver addresses have been read and the allocation of the mail items to the stopping points from the distribution order, according to the respective sorting plan has taken place. The sticker dispenser is located in a sorting machine between the reading unit and the distribution unit and presses the sticker on a specified place of the selected mail item which is read and sorted according to the sorting plan. The mail item is transferred past the sticker dispenser during this process and, upon reaching the intended location of application of the respective mail item, the application of the sticker occurs during the transfer past the sticker dispenser.

To put minimize pressure on the stickers and mail items, it is preferable to apply the stickers during the last sorting run. The sections of a stack to be marked generally comprise mail items to be distributed by an individual letter carriers and/or mail items which account for the individual stopping points.

If there are several sections in a stack of mail items to be distinguished, then it is advantageous to mark these by different colored stickers or by stickers with different printed identifications. A further advantageous possibility for the differentiation is to apply the stickers at various places of the mail item. In order to avoid having to stop the mail items for individual sticker printing, the printing preferably occurs in conjunction with transfer time and direction of the mail items.

The above and other advantages are effected by the present invention which comprises a method for marking a section of items in a stack, comprising the steps of: sorting said items with a sorting machine according to a select distribution order; reading identifying information on said item with a reading unit, said information indicative of a last item in accordance with said distribution order, said reading unit functionally associated with said sorting machine; applying a sticker to said last item with a sticker dispenser, said dispenser functionally associated with said sorting machine and positioned downstream from said reading unit; and distributing said items according to said distribution order with a distribution unit, said distribution unit positioned downstream from said sticker dispenser.

The above and still other advantages are effected by the present invention which further comprises A system for marking sections of a stack of items, comprising: a sorting machine for selectively sorting and stacking said items, said sorting machine comprising a control unit, at least one conveyance route, and determining means, said determining means functionally associated with said control unit to provide said unit with information regarding item location within said stack and speed and direction of items conveyed along said route; and a sticker dispenser for applying stickers to said items, said dispenser functionally associated with said control unit and positioned along said route so as to receive said information and selectively apply a sticker to a select item in accordance with said information.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

DETAILED DESCRIPTION OF THE INVENTION

Figure 1:
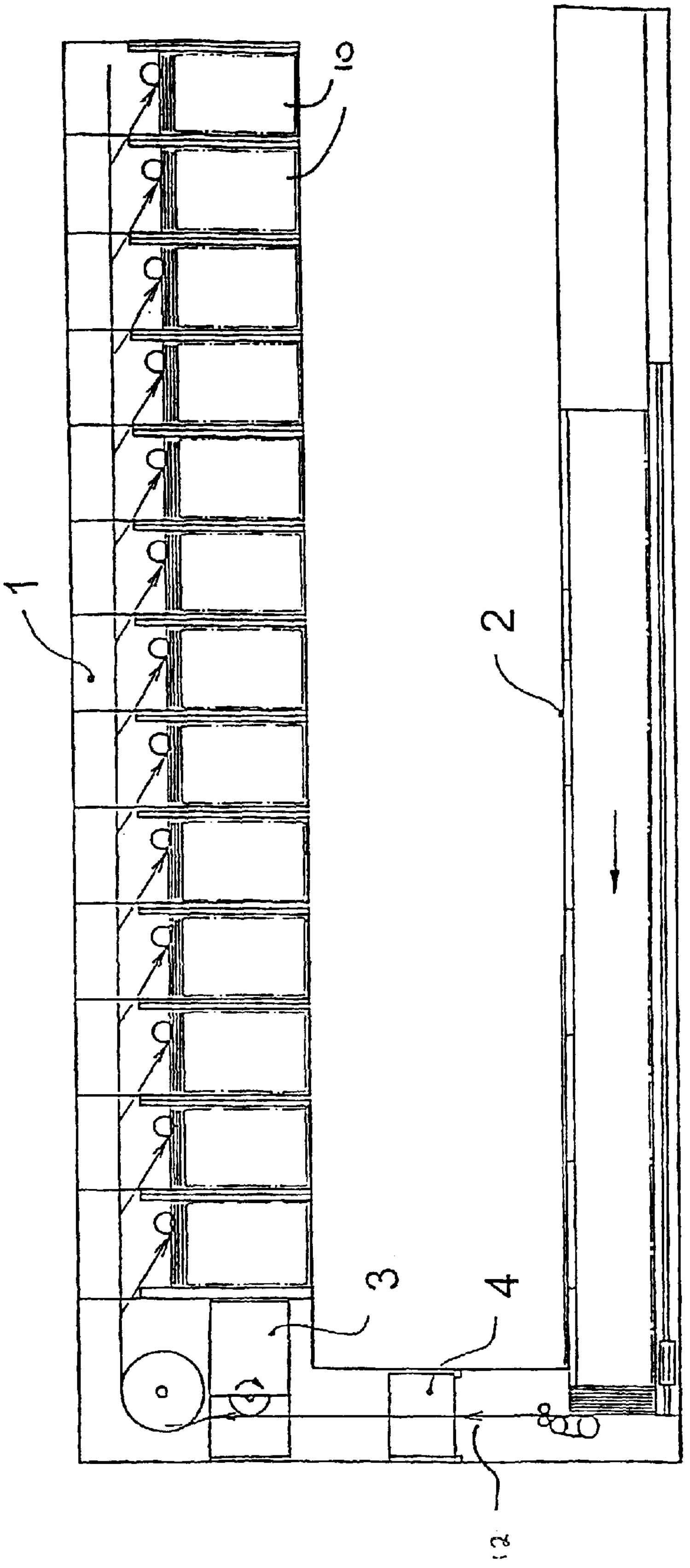
FIG. 1 is a schematic top view of a sorting machine with a sticker dispenser.

As shown in FIG. 1, mail items to be sorted are placed edgewise on a feeder 2, from where they are moved to a mail separator device by a holder (not shown). The respective foremost mail item is removed from the stack and individually transferred away in the direction of the arrow 12, for example by a known system. First, the respective mail item arrives at a reading unit 4, where the receiver address is read. Then the mail item goes through a somewhat lengthy letter running distance, to give the reading unit 4 time to effect the reading process. Then the mail item is transferred past an automatic sticker dispenser 3 and sorted into bins 10, positioned along sorting line 1, in accordance with the unit's digits of stopping point numbers. The allocation of the receiver addresses to the retaining stations occurs according to the loaded sorting plan. Because the composition of the stack to be sorted is still unknown at the beginning of this first run, some bins may over flow. The overflowing mail items are then sorted into a bin marked for overflow.

After this first sorting run, the mail items are withdrawn from the sorting bins 10, of sorting line 1, and placed on the feeder 2. Attention is paid to observing the order of mail items to be sorted into bins. The mail items from the overflow bins are sorted according to their allocation in the stack with respect to the other mail items of the overflowing bin.

In the second sorting run according to the tens digit, all mail items and their allocation to the retaining stations are known. Accordingly, the mail items can be distributed to the bins during this run in such a way that no subsequent sorting of overflow mail items is necessary. After this second sorting run, a transfer to feeder 2 according to the order again occurs and the third sorting run on the hundreds digit is carried out.

Figure 2:
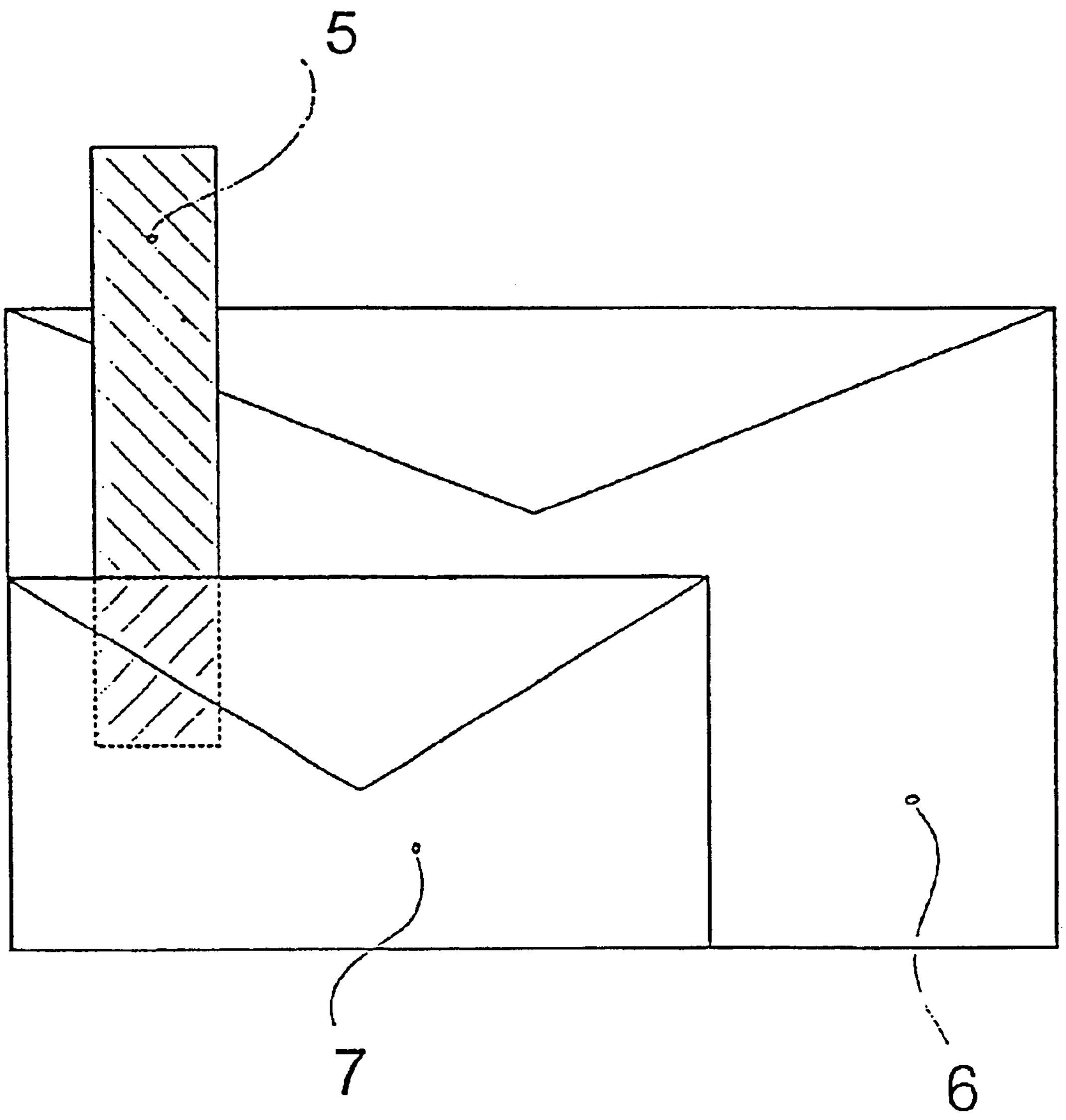
FIG. 2 is a side view of a letter stack where the foremost letter is provided with a sticker.

After the addresses were read in the first sorting run and the order of the mail items determined during the distribution process on the basis of the sorting plan, the application of stickers 5 by an automatic sticker dispenser 3 for subsequent sorting runs can take place. The stickers 5 are applied to the last mail item 7 of the stack to be marked or, if necessary, additionally to the first mail item of the stack which may occur if for example only a certain section within the stack should be marked. For easy application of the stickers 5 to mail items, the application of the stickers 5 on the mail items takes place only in the last sorting run. The stickers 5 are applied by the sticker dispenser 3 in a transfer direction during the transport of the mail items 6, 7 by a pressure roller in such a way that the stickers 5 project upwards or away from the stack of mail items. Because the mail items have different sizes, as depicted in FIG. 2, the stickers must always have the same position in a vertical direction as well as the same length. Accordingly, they have such a position and length that the section which is provided with glue only gets to the areas which are covered by the smallest mail items and the stickers 5 project over the largest mail pieces 6. The pressure roller is accelerated to a circumferential speed, for the application process, which corresponds to the speed of transport of the mail item. For the differentiation of the marked sections of a stack, the stickers can be imprinted with an additional printer or the stickers are multi-colored, i.e. several sticker dispensers 3 are placed in the sorting machine or the stickers 5 are applied at different locations in transfer direction on the mail items. This is obtained by the modification of the application times starting from the front edge of the mail items.

The sorting machine may comprise a control unit for effecting communication among the above cited elements for facilitating the steps and effects described above. Determining means known in the art for providing the speed and direction of items being sorted may also be included.

The stickers may comprise a plurality of colors and/or fluorescence which may indicate the location of the item in the section or stack and/or distinguish among the sections or stacks. The stackers may further include readable code, such as machine readable code, again indicating the aforementioned. Likewise, the location of application of the sticker on the item may further be used as an indication of the aforementioned.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

I claim:

1. A method for marking a section of items in a stack, comprising the steps of:

sorting said items with a sorting machine according to a select distribution order;

reading identifying information on said item with a reading unit, said information indicative of a last item in accordance with said distribution order, said reading unit functionally associated with said sorting machine;

automatically applying a sticker to said last item with a sticker dispenser, said dispenser functionally associated with said sorting machine and positioned downstream from said reading unit, and said sticker comprising a plurality of stickers which further comprise select colors indicative of a position of an item in said stack; and distributing said items according to said distribution order with a distribution unit, said distribution unit positioned downstream from said sticker dispenser.

2. The method according to claim 1, wherein said stickers are applied during a final sorting run.

3. The method according to claim 1, wherein said items are mail items.

4. The method according to claim 3, wherein said section is delineated according to a letter carrier sorting plan.

5. The method according to claim 3, wherein said step of reading further comprises reading a mail item destination address and wherein said section is delineated according to said address.

6. The method according to claim 1, wherein said section is delineated according to an individual stopping point in said distribution order.

7. The method according to claim 1, wherein said sticker comprises a plurality of stickers which further comprise select shapes indicative of a position of an item in said stack.

8. The method according to claim 1, wherein said sticker comprises a plurality of stickers which further comprise readable code.

9. The method according to claim 8, wherein said code is indicative of a position of an item in said stack.

10. The method according to claim 8, wherein said code is machine readable.

11. The method according to claim 1, wherein said sticker comprises a plurality of stickers which further comprise select fluorescence indicative of a position of an item in said stack.

12. The method according to claim 1, wherein said step of determining further comprises the step of determining a first item in said section.

13. The method according to claim 12, wherein said step of applying a sticker, further comprises the step of applying a sticker to said first item.

14. The method according to claim 1, wherein said distribution order is based upon a destination address of said item.

15. The method according to claim 14, wherein said identifying information is said destination address.

16. The method according to claim 1, wherein said sticker dispenser is selectively controlled in accordance with said reading unit and sorting unit.

17. The method according to claim 1, further comprising the step of removing said stickers prior to delivery of said items to recipients.

18. The method according to claim 1, wherein said sticker is imprinted with identification data for distinguishing among several sections in an item stack.

19. The method according to claim 1, wherein said stickers are applied to select locations on said items so as to distinguish among select locations within said section.

20. The method according to claim 19, wherein said locations facilitate distinction among different sections.

21. The method according to claim 1, wherein said stickers are applied to said items in a direction of motion of said items.

22. The method according to claim 21, wherein said sticker application unit further comprises means for applying said sticker in accordance with a speed of motion of said items.

23. The method according to claim 1, wherein said sorting unit further comprises a control unit, and further comprising the step of using said control unit to effect communication among said sorting unit, reading unit, sticker dispenser and distribution unit.

24. A system for marking sections of a stack of items, comprising:

a sorting machine for selectively sorting and stacking said items, said sorting machine comprising a control unit, at least one conveyance route, and determining means, said determining means functionally associated with said control unit to provide said unit with information regarding item location within said stack and speed and direction of items conveyed along said route; and a sticker dispenser for automatically applying stickers to said items, said dispenser functionally associated with said control unit and positioned along said route so as to receive said information and selectively and automatically apply a sticker to a select item in accordance with said information and wherein said stickers are color coded.

25. The system according to claim 24, wherein said item is a mail item.

26. The system according to claim 24, further comprising a reading unit positioned along said route for reading destination information on said item, said reading unit in functional association with said control unit so as to provide said control unit with said destination information.

27. The system according to claim 26, wherein said selectively sorting is based upon said destination information.

28. The system according to claim 27, wherein said code is machine readable and indicative of location of an item within said stack.

29. The system according to claim 24, wherein said stickers comprise readable code.

30. The system according to claim 24, wherein said stickers are fluorescent.

31. The system according to claim 24, wherein said items comprise mail items and said selectively sorting is based upon mail delivery routes.

32. The system according to claim 24, wherein said control unit activates said dispenser.

33. The system according to claim 24, further comprising a printer functionally associated with said dispenser, said printer printing select information on said sticker.

34. The system according to claim 24, further comprising a printer functionally associated with said dispenser, said printer printing select color on said sticker.

35. The system according to claim 24, wherein said dispenser comprises means for applying said sticker to different locations on said items, said locations indicative of item location within said stack.

* * * * *